US009266700B2

(12) United States Patent
Schneider et al.

(10) Patent No.: US 9,266,700 B2
(45) Date of Patent: Feb. 23, 2016

(54) CRANE CONTROLLER WITH DRIVE CONSTRAINT

(71) Applicant: Liebherr-Werk Nenzing GmbH, Nenzing (AT)

(72) Inventors: Klaus Schneider, Hergatz (DE); Eckard Arnold, Illmenau (DE); Sebastian Kuechler, Boeblingen (DE); Oliver Sawodny, Stuttgart (DE)

(73) Assignee: Liebherr-Werk Nenzing GmbH, Nenzing (AT)

(*) Notice: Subject to any disclaimer, the term of this patent is extended or adjusted under 35 U.S.C. 154(b) by 321 days.

(21) Appl. No.: 13/788,856

(22) Filed: Mar. 7, 2013

(65) Prior Publication Data

US 2013/0245817 A1 Sep. 19, 2013

(30) Foreign Application Priority Data

Mar. 9, 2012 (DE) ........................ 10 2012 004 803

(51) Int. Cl.

*G06F 7/70* (2006.01)
*B66C 13/04* (2006.01)
*B66C 13/02* (2006.01)
*B66C 13/08* (2006.01)

(52) U.S. Cl.

CPC ................ *B66C 13/04* (2013.01); *B66C 13/02* (2013.01); *B66C 13/085* (2013.01)

(58) Field of Classification Search

CPC .......... B66B 7/06; B66C 13/02; B66C 13/04; B66C 13/10; B66C 13/085; B66C 13/063; B66C 23/52; B63B 27/10; E21B 19/02; E21B 19/09; Y10S 254/90

USPC ............... 701/36, 49, 50; 700/228; 172/4.5, 9

See application file for complete search history.

(56) References Cited

U.S. PATENT DOCUMENTS

| | | | | |
|---|---|---|---|---|
| 6,216,789 | B1 * | 4/2001 | Lorsignol et al. | 166/355 |
| 7,793,763 | B2 * | 9/2010 | Zhu et al. | 187/411 |
| 2004/0164041 | A1 * | 8/2004 | Sawodny et al. | 212/273 |
| 2010/0230370 | A1 * | 9/2010 | Schneider et al. | 212/276 |

FOREIGN PATENT DOCUMENTS

| | | | |
|---|---|---|---|
| DE | 3418026 | C2 | 4/1987 |
| DE | 3643114 | A1 | 8/1987 |
| DE | 19645812 | C1 | 2/1998 |
| DE | 102008024513 | A1 | 11/2009 |

(Continued)

OTHER PUBLICATIONS

Schneider, K. et al., "Crane Controller with Division of a Kinematically Constrained Quantity of the Hoisting Gear", U.S. Appl. No. 13/788,828, 43 pages, filed Mar. 7, 2013.

(Continued)

*Primary Examiner* — Gertrude Arthur Jeanglaude
(74) *Attorney, Agent, or Firm* — Alleman Hall McCoy Russell & Tuttle LLP

(57) ABSTRACT

The present disclosure shows a crane controller for a crane which includes a hoisting gear for lifting a load hanging on a cable, with an active heave compensation which by actuating the hoisting gear at least partly compensates the movement of the cable suspension point and/or a load deposition point due to the heave, wherein the heave compensation takes account of at least one constraint of the hoisting gear when calculating the actuation of the hoisting gear.

20 Claims, 7 Drawing Sheets

(56) References Cited

FOREIGN PATENT DOCUMENTS

| | | | |
|---|---|---|---|
| DE | 102009032269 | A1 | 1/2011 |
| EP | 0176832 | A1 | 4/1986 |
| EP | 1757554 | A2 | 2/2007 |
| GB | 2132972 | A | 7/1984 |
| WO | 0227684 | A1 | 4/2002 |
| WO | 2009038468 | A1 | 3/2009 |

OTHER PUBLICATIONS

Langer, K. et al., “Crane Controller with Cable Force Mode”, U.S. Appl. No. 13/788,851, 40 pages, filed Mar. 7, 2013.

* cited by examiner

CRANE CONTROLLER WITH DRIVE CONSTRAINT

CROSS REFERENCE TO RELATED APPLICATION

This application claims priority to German Patent Application No. 10 2012 004 803.3, entitled "Crane Controller with Drive Constraint," filed Mar. 9, 2012, which is hereby incorporated by reference in its entirety for all purposes.

TECHNICAL FIELD

The present disclosure relates to a crane controller for a crane which includes a hoisting gear for lifting a load hanging on a cable. The crane controller comprises an active heave compensation which by actuating the hoisting gear at least partly compensates the movement of the cable suspension point and/or a load deposition point due to the heave.

BACKGROUND AND SUMMARY

Such crane controller is known from DE 10 2008 024513 A1. There is provided a prediction device which predicts a future movement of the cable suspension point with reference to the determined current heave movement and a model of the heave movement, wherein a path controller of the load at least partly compensates the predicted movement of the cable suspension point.

For actuating the hoisting gear, DE 10 2008 024513 A1 creates a dynamic model of the hydraulically operated winch and the load hanging on the cable and creates a sequence control unit therefrom by inversion. For realizing a state control, unknown states of the load are reconstructed form a force measurement via an observer.

It is the object of the present disclosure to provide an improved crane controller.

According to the present disclosure, this object is solved in a first aspect by a crane controller according to claim 1 and in a second aspect by a crane controller according to claim 4.

In a first aspect, the present disclosure shows a crane controller for a crane which includes a hoisting gear for lifting a load hanging on a cable. The crane controller includes an active heave compensation which by actuating the hoisting gear at least partly compensates the movement of the cable suspension point and/or a load deposition point due to the heave. According to the present disclosure, it is provided that the heave compensation takes account of at least one constraint of the hoisting gear when calculating the actuation of the hoisting gear. By taking account of the constraint of the hoisting gear it is ensured that the hoisting gear actually can follow the control commands calculated due to the heave compensation and/or that the hoisting gear or the crane is not damaged by the actuation.

According to the present disclosure, the heave compensation can take account of a maximum admissible jerk. It thereby is ensured that the hoisting gear or the structure of the crane is not damaged by the actuation of the hoisting gear due to the heave compensation. Beside a maximum admissible jerk, a steady course of the jerk furthermore can be requested.

Alternatively or in addition, the heave compensation can take account of a maximum available power.

Alternatively or in addition, the heave compensation can take account of a maximum available acceleration. Such maximum available acceleration for example can result from the maximum power of the drive of the hoisting gear and/or the length of the cable unwound already and the weight force of the cable thereby acting on the hoisting gear and/or due to the load of the hoisting gear caused by the weight force to be lifted.

Furthermore alternatively or in addition, the heave compensation can take account of a maximum available velocity. The maximum available velocity for the heave compensation also can be obtained as described above with regard to the maximum available acceleration.

Furthermore, the crane controller can include a calculation operation which calculates the at least one constraint of the hoisting gear. For this purpose, the calculation operation can evaluate in particular sensor data and/or actuation signals. By the calculation operation, the currently applicable constraints of the hoisting gear can each be communicated to the heave compensation.

In particular, the constraints of the hoisting gear can change during a lift, which can be taken into account by the heave compensation according to the present disclosure.

The calculation operation each can exactly calculate a currently available at least one kinematically constrained quantity of the hoisting gear, in particular the maximum available power and/or velocity and/or acceleration of the hoisting gear. Advantageously, the calculation operation takes account of the length of the unwound cable and/or the cable force and/or the power available for driving the hoisting gear.

According to the present disclosure, the crane controller can be used for actuating a hoisting gear whose drive is connected with an energy accumulator. The amount of energy stored in the energy accumulator influences the power available for driving the hoisting gear. Advantageously, the amount of energy stored in the energy accumulator or the power available for driving the hoisting gear therefore is included in the calculation operation according to the present disclosure.

In particular, the hoisting gear according to the present disclosure can be actuated hydraulically, wherein a hydraulic energy accumulator is provided in the hydraulic circuit for driving the hoisting winch of the hoisting gear.

Alternatively, an electric drive can be used. The same can also be connected with an energy accumulator.

Advantageously, the crane controller furthermore comprises a path planning module which determines a trajectory with reference to the predicted movement of the cable suspension point and/or a load deposition point and by taking account of the constraints of the hoisting gear. According to the present disclosure the drive constraints, in particular the drive constraints with regard to the power, the velocity, the acceleration and/or the jerk can explicitly be taken into account when planning the trajectories. The trajectory in particular can be a trajectory of the position and/or velocity and/or acceleration of the hoisting gear.

Advantageously, the path planning module includes an optimization operation which with reference to the predicted movement of the cable suspension point and/or a load deposition point and by taking account of the constraint of the hoisting gear determines a trajectory which minimizes the residual movement of the load due to the movement of the cable suspension point and/or the differential movement between the load and the load deposition point due to the movement of the load deposition point. According to the present disclosure, the at least one drive constraint thus can be taken into account within the optimal control problem. Within the optimal control problem, the constraint of the drive in particular is taken into account with regard to power and/or velocity and/or acceleration and/or jerk.

The optimization operation advantageously calculates an optimal path with reference to a predicted vertical position and/or vertical velocity of the cable suspension point and/or a load deposition point, which by taking account of the kinematic constraints minimizes the residual movement and/or differential movement of the load.

In a second aspect, the present disclosure comprises a crane controller for a crane which includes a hoisting gear for lifting a load hanging on a cable. The crane controller comprises an active heave compensation which by actuating the hoisting gear at least partly compensates the movement of the cable suspension point and/or a load deposition point due to the heave. According to the present disclosure, the heave compensation includes a path planning module which with reference to a predicted movement of the cable suspension point and/or a load deposition point calculates a trajectory of the position and/or velocity and/or acceleration of the hoisting gear, which is included in a setpoint value for a subsequent control of the hoisting gear. Due to this structure of the heave compensation a particularly stable and easily realizable actuation of the hoisting gear is obtained. In particular, the unknown load position no longer must be reconstructed with great effort.

According to the present disclosure, the controller of the hoisting gear can feed back measured values to position and/or velocity of the hoisting winch. The path planning module hence specifies a position and/or velocity of the hoisting winch as setpoint value, which in the subsequent controller is matched with actual values.

Furthermore, it can be provided that the controller of the hoisting gear takes account of the dynamics of the drive of the hoisting winch by a pilot control. In particular, the pilot control can be based on an inversion of a physical model which describes the dynamics of the drive of the hoisting winch. In particular, the hoisting winch can be a hydraulically operated hoisting winch.

The first and the second aspect of the present disclosure each are protected separately by the present application and can each be realized separately and without the respective other aspect.

Particularly, however, the two aspects according to the present disclosure are combined with each other. In particular, it can be provided that the path planning module according to the second aspect of the present disclosure takes account of at least one constraint of the hoisting gear when determining the trajectory.

The crane controller according to the present disclosure furthermore can include an operator control which actuates the hoisting gear with reference to specifications of the operator.

Advantageously, the controller therefore includes two separate path planning modules via which trajectories for the heave compensation and for the operator control are calculated separate from each other. In particular, these trajectories can be trajectories for the position and/or velocity and/or acceleration of the hoisting gear.

Furthermore, the trajectories specified by the two separate path planning modules can be added up and serve as setpoint values for the control and/or regulation of the hoisting gear.

Furthermore, it can be provided according to the present disclosure that the division of at least one kinematically constrained quantity between heave compensation and operator control is adjustable, wherein the adjustment for example can be effected by a weighting factor by which the maximum available power and/or velocity and/or acceleration of the hoisting gear is split up between the heave compensation and the operator control.

Such division is easily possible in the heave compensation according to the present disclosure, which anyway takes account of constraints of the hoisting gear. In particular, the division of the at least one kinematically constrained quantity is taken into account as constraint of the hoisting gear. Advantageously, the operator control also takes account of at least one constraint of the drive, and in particular of the maximum admissible jerk and/or a maximum available power and/or a maximum available acceleration and/or a maximum available velocity.

According to the present disclosure, the optimization operation of the heave compensation can determine a target trajectory which is included in the control and/or regulation of the hoisting gear. In particular, as described above, the optimization operation can calculate a target trajectory of the position and/or velocity and/or acceleration of the hoisting gear, which is included in a setpoint value for a subsequent control of the hoisting gear. The optimization can be effected via a discretization.

According to the present disclosure, the optimization can be effected at each time step on the basis of an updated prediction of the movement of the load lifting point.

According to the present disclosure, the first value of the target trajectory each can be used for controlling the hoisting gear. When an updated target trajectory then is available, only the first value thereof will in turn be used for the control.

According to the present disclosure, the optimization operation can work with a lower scan rate than the control. This provides for choosing greater scan times for the calculation-intensive optimization operation, for the less calculation-intensive control, on the other hand, a greater accuracy due to lower scan times.

Furthermore, it can be provided that the optimization operation makes use of an emergency trajectory planning when no valid solution can be found. In this way, a proper operation also is ensured when a valid solution cannot be found.

The crane controller according to the present disclosure can comprise a measuring device which determines a current heave movement from the sensor data. For example, gyroscopes and/or tilt angle sensors can be employed as sensors. The sensors can be arranged at the crane or at a pontoon on which the crane is arranged, for example on the crane base and/or on a pontoon on which the load deposition position is arranged.

The crane controller furthermore can comprise a prediction device which predicts a future movement of the cable suspension point and/or a load deposition point with reference to the determined current heave movement and a model of the heave movement.

Advantageously, the model of the heave movement as used in the prediction device is independent of the properties, and in particular independent of the dynamics of the pontoon. The crane controller thereby can be used independent of the pontoon on which the crane and/or the load deposition position is arranged.

The prediction device can determine the prevailing modes of the heave movement from the data of the measuring device. In particular, this can be effected via a frequency analysis.

Furthermore, the prediction device can create a model of the heave with reference to the determined prevailing modes. With reference to this model, the future heave movement then can be predicted.

Advantageously, the prediction device continuously parameterizes the model with reference to the data of the measuring device. In particular an observer can be used, which is parameterized continuously. Particularly, the amplitude and the phase of the modes can be parameterized.

Furthermore, it can be provided that in the case of a change of the prevailing modes of the heave the model is updated.

Particularly, the prediction device as well as the measuring device can be configured such as is described in DE 10 2008 024513 A1, whose contents are fully made the subject-matter of the present application.

In the control concept according to the present disclosure, the dynamics of the load furthermore advantageously can be neglected due to the extendability of the cable. This results in a distinctly simpler structure of the controller.

The present disclosure furthermore comprises a crane with a crane controller as it has been described above.

In particular, the crane can be arranged on a pontoon. In particular, the crane can be a deck crane. Alternatively, it can also be an offshore crane, a harbor crane or a cable excavator.

The present disclosure furthermore comprises a pontoon with a crane according to the present disclosure, in particular a ship with a crane according to the present disclosure.

Furthermore, the present disclosure comprises the use of a crane according to the present disclosure and a crane controller according to the present disclosure for lifting and/or lowering a load located in water and/or the use of a crane according to the present disclosure and a crane controller according to the present disclosure for lifting and/or lowering a load from and/or to a load deposition position located in water, for example on a ship. In particular, the present disclosure comprises the use of the crane according to the present disclosure and the crane controller according to the present disclosure for deep-sea lifts and/or for loading and/or unloading ships.

The present disclosure furthermore comprises a method for controlling a crane which includes a hoisting gear for lifting a load hanging on a cable. A heave compensation at least partly compensates the movement of the cable suspension point and/or a load deposition point due to the heave by an automatic actuation of the hoisting gear. According to the present disclosure, it is provided in accordance with a first aspect that the heave compensation takes account of at least one constraint of the hoisting gear when calculating the actuation of the hoisting gear. In accordance with a second aspect, on the other hand, it is provided that the heave compensation calculates a trajectory of the position and/or velocity and/or acceleration of the hoisting gear with reference to a predicted movement of the cable suspension point, which is included in a setpoint value for a subsequent control of the hoisting gear. The method according to the present disclosure has the same advantages which have already been described with regard to the crane controller.

Furthermore, the method can be carried out such as has also been described above. In particular, the two aspects according to the present disclosure also can be combined in the method.

Furthermore, the method according to the present disclosure can be effected by a crane controller as it has been described above.

The present disclosure furthermore comprises software with code for execution as method according to the present disclosure. In particular, the software can be stored on a machine-readable data carrier. Advantageously, a crane controller according to the present disclosure can be implemented by installing the software on a crane controller.

Advantageously, the crane controller according to the present disclosure is realized electronically, in particular by an electronic control computer. The control computer advantageously is connected with sensors. In particular, the control computer can be connected with the measuring device. Advantageously, the control computer generates control signals for actuating the hoisting gear.

The hoisting gear can be a hydraulically driven hoisting gear. In accordance with the present disclosure, the control computer of the crane controller according to the present disclosure can actuate the swivel angle of at least one hydraulic displacement machine of the hydraulic drive system and/or at least one valve of the hydraulic drive system.

In one example, a hydraulic accumulator is provided in the hydraulic drive system, via which energy can be stored when lowering the load, which then is available as additional power when lifting the load.

Advantageously, the actuation of the hydraulic accumulator is effected separate from the actuation of the hoisting gear according to the present disclosure.

Alternatively, an electric drive can also be used. The same can also comprise an energy accumulator.

The present disclosure will now be explained in detail with reference to exemplary embodiments and drawings.

DETAILED DESCRIPTION

Figure 1:
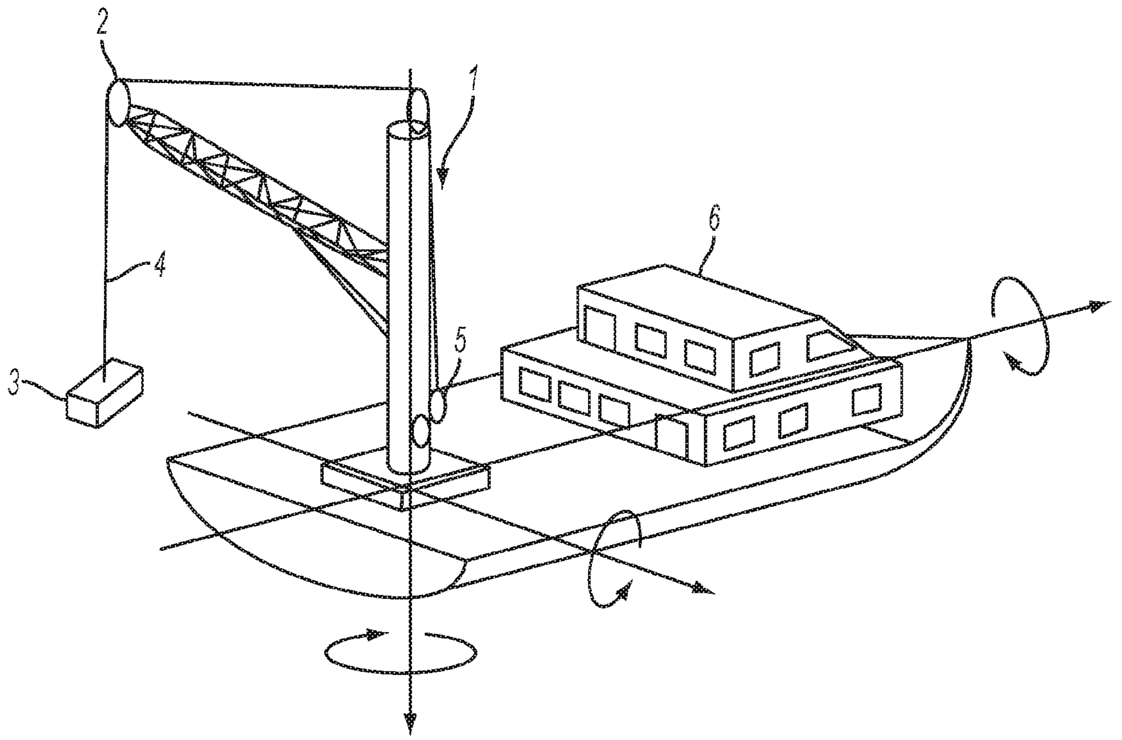
FIG. 1 shows a crane according to the present disclosure arranged on a pontoon.

FIG. 1 shows an exemplary embodiment of a crane 1 with a crane controller according to the present disclosure for actuating the hoisting gear 5. The hoisting gear 5 includes a hoisting winch which moves the cable 4. The cable 4 is guided over a cable suspension point 2, in the exemplary embodiment a deflection pulley at the end of the crane boom, at the crane. By moving the cable 4, a load 3 hanging on the cable can be lifted or lowered.

There can be provided at least one sensor which measures the position and/or velocity of the hoisting gear and transmits corresponding signals to the crane controller.

Furthermore, at least one sensor can be provided, which measures the cable force and transmits corresponding signals to the crane controller. The sensor can be arranged in the region of the crane body, in particular in a mount of the winch 5 and/or in a mount of the cable pulley 2.

In the exemplary embodiment, the crane 1 is arranged on a pontoon 6, here a ship. As is likewise shown in FIG. 1, the pontoon 6 moves about its six degrees of freedom due to the heave. The crane 1 arranged on the pontoon 6 as well as the cable suspension point 2 also are moved thereby.

The crane controller according to the present disclosure can include an active heave compensation which by actuating the hoisting gear at least partly compensates the movement of the cable suspension point 2 due to the heave. In particular, the vertical movement of the cable suspension point due to the heave is at least partly compensated.

The heave compensation can comprise a measuring device which determines a current heave movement from sensor data. The measuring device can comprise sensors which are arranged at the crane foundation. In particular, this can be gyroscopes and/or tilt angle sensors. Particularly, three gyroscopes and three tilt angle sensors are provided.

Furthermore a prediction device can be provided, which predicts a future movement of the cable suspension point 2 with reference to the determined heave movement and a model of the heave movement. In particular, the prediction device solely predicts the vertical movement of the cable suspension point. In connection with the measuring and/or prediction device, a movement of the ship at the point of the sensors of the measuring device possibly can be converted into a movement of the cable suspension point.

The prediction device and the measuring device advantageously are configured such as is described in more detail in DE 10 2008 024513 A1.

Alternatively, the crane according to the present disclosure also might be a crane which is used for lifting and/or lowering a load from or to a load deposition point arranged on a pontoon, which therefore moves with the heave. In this case, the prediction device must predict the future movement of the load deposition point. This can be effected analogous to the procedure described above, wherein the sensors of the measuring device are arranged on the pontoon of the load deposition point. The crane for example can be a harbor crane, an offshore crane or a cable excavator.

In the exemplary embodiment, the hoisting winch of the hoisting gear 5 is driven hydraulically. In particular, a hydraulic circuit of hydraulic pump and hydraulic motor is provided, via which the hoisting winch is driven. In one example, a hydraulic accumulator can be provided, via which energy is stored on lowering the load, so that this energy is available when lifting the load.

Alternatively, an electric drive might be used. The same might also be connected with an energy accumulator.

In the following, an exemplary embodiment of the present disclosure will now be shown, in which a multitude of aspects of the present disclosure are jointly realized. The individual aspects can, however, also each be used separately for developing the embodiment of the present disclosure as described in the general part of the present application.

The crane controller may be a microcomputer including: a microprocessor unit, input/output ports, read-only memory, random access memory, keep alive memory, and a data bus. As noted above, software with code for carrying out the methods according to the present disclosure may be stored on a machine-readable data carrier in the controller. Advantageously, a crane controller according to the present disclosure can be implemented by installing the software according to the present disclosure on a crane controller. The crane controller may receive various signals from sensors coupled to the crane and/or pontoon. In one example, the software may include various programs (including control and estimation routines, operating in real-time), such as heave compensation, as described herein. The specific routines described herein may represent one or more of any number of processing strategies such as event-driven, interrupt-driven, multitasking, multi-threading, and the like. Thus, the described methods may represent code to be programmed into the computer readable storage medium in the crane control system.

Additionally, the present disclosure describes various operations, each of which may be formed via instructions stored in non-transitory memory in the controller.

Planning of Reference Trajectories

For implementing the required predictive behavior of the active heave compensation, a sequential control consisting of a pilot control and a feedback in the form of a structure of two degrees of freedom is employed. The pilot control is calculated by a differential parameterization and requires reference trajectories steadily differentiable two times.

For planning it is decisive that the drive can follow the specified trajectories. Thus, constraints of the hoisting gear must also be taken into account. Starting point for the consideration are the vertical position and/or velocity of the cable suspension point $\tilde{z}_a^h$ and $\dot{z}_a^h$, which are predicted e.g. by the algorithm described in DE 10 2008 024 513 over a fixed time horizon. In addition, the hand lever signal of the crane operator, by which he moves the load in the inertial coordinate system, also is included in the trajectory planning as an operator input.

For safety reasons it is necessary that the winch also can still be moved via the hand lever signal in the case of a failure of the active heave compensation. With the used concept for trajectory planning, a separation between the planning of the reference trajectories for the compensation movement and those as a result of a hand lever signal therefore is effected, as is shown in FIG. 2.

In the Figure, $y_a^*$, $\dot{y}_a^*$ and $\ddot{y}_a^*$ designate the position, velocity and acceleration planned for the compensation, and $y_l^*$, $\dot{y}_l^*$ and $\ddot{y}_l^*$ the position, velocity and acceleration for the superimposed unwinding or winding of the cable as planned on the basis of the hand lever signal. In the further course of the execution, planned reference trajectories for the movement of the hoisting winch always are designated with $y^*$, $\dot{y}^*$ and $\ddot{y}^*$, respectively, since they serve as reference for the system output of the drive dynamics.

Due to the separate trajectory planning it is possible to use the same trajectory planning and the same sequential controller with the heave compensation switched off or in the case of a complete failure of the heave compensation (e.g. due to failure of the IMU) for the hand lever control in manual operation and thereby generate an identical operating behavior with the heave compensation switched on.

Figure 2:
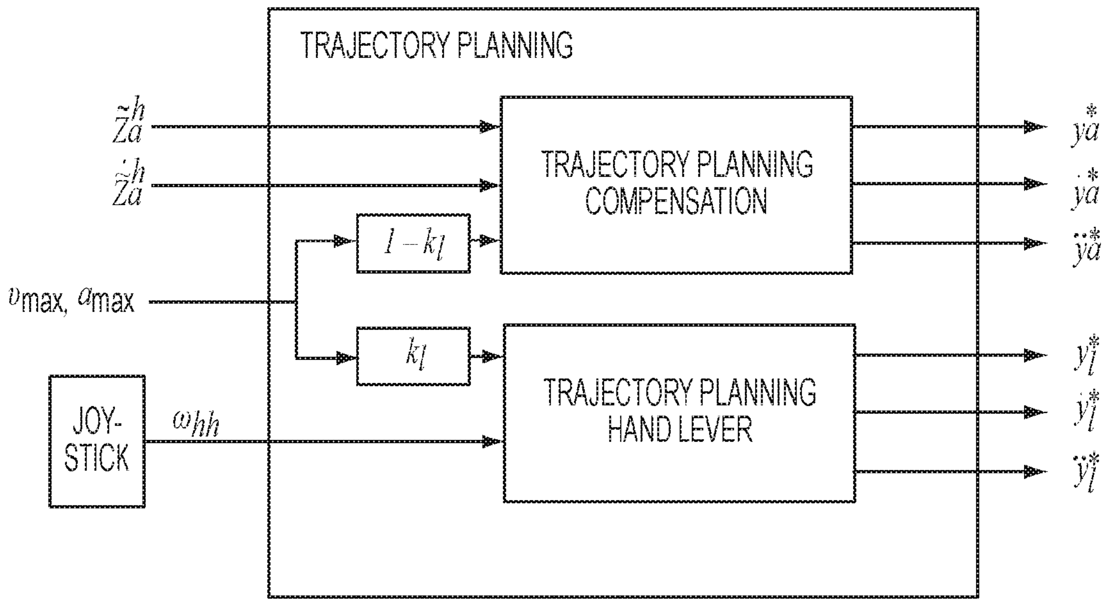
FIG. 2 shows the structure of a separate trajectory planning for the heave compensation and the operator control.

In order not to violate the given constraints in velocity $v_{max}$ and acceleration $a_{max}$ despite the completely independent planning, $v_{max}$ and $a_{max}$ are split up by a weighting factor $0 \leq k_l \leq 1$ (cf. FIG. 2). The same is specified by the crane operator and hence provides for individually splitting up the power which is available for the compensation and/or for moving the load. Thus, the maximum velocity and acceleration of the compensation movement are $(1-k_l)v_{max}$ and $(1-k_l)a_{max}$ and the trajectories for the superimposed unwinding and winding of the cable are $k_l v_{max}$ and $k_l a_{max}$.

A change of $k_l$ can be performed during operation. Since the maximum possible traveling speed and acceleration are dependent on the total mass of cable and load, $v_{max}$ and $a_{max}$ also can change in operation. Therefore, the respectively applicable values likewise are handed over to the trajectory planning.

By splitting up the power, the control variable constraints possibly are not utilized completely, but the crane operator can easily and intuitively adjust the influence of the active heave compensation.

A weighting of $k_l=1$ is equal to switching off the active heave compensation, whereby a smooth transition between a compensation switched on and switched off becomes possible.

The first part of the chapter initially explains the generation of the reference trajectories $y_a^*$, $\dot{y}_a^*$ and $\ddot{y}_a^*$ for compensating the vertical movement of the cable suspension point. The essential aspect here is that with the planned trajectories the vertical movement is compensated as far as is possible due to the given constraints set by $k_l$.

Therefore, by the vertical positions and velocities of the cable suspension point $\tilde{z}_a^h=[\tilde{z}_a^h(t_k+T_{p,1}) \ldots \tilde{z}_a^h(t_k+T_{p,K_p})]_T$ and $\dot{\tilde{z}}_a^h=[\dot{\tilde{z}}_a^h(t_k+T_{p,1}) \ldots \dot{\tilde{z}}_a^h(t_k+T_{p,K_p})]^T$ predicted over a complete time horizon, an optimal control problem therefore is formulated, which is solved cyclically, wherein $K_p$ designates the number of the predicted time steps. The associated numerical solution and implementation will be discussed subsequently.

The second part of the chapter deals with the planning of the trajectories $y_l^*$, $\dot{y}_l^*$ and $\ddot{y}_l^*$ for traveling the load. The same are generated directly from the hand lever signal of the crane operator $w_{hh}$. The calculation is effected by an addition of the maximum admissible jerk.

Reference Trajectories for the Compensation

In the trajectory planning for the compensation movement of the hoisting winch, sufficiently smooth trajectories must be generated from the predicted vertical positions and velocities of the cable suspension point taking into account the valid drive constraints. This task subsequently is regarded as constrained optimization problem, which can be solved online at each time step. Therefore, the approach resembles the draft of a model-predictive control, although in the sense of a model-predictive trajectory generation.

As references or setpoint values for the optimization the vertical positions and velocities of the cable suspension point $\tilde{z}_a^h=[\tilde{z}_a^h(t_k+T_{p,1}) \ldots \tilde{z}_a^h(t_k+T_{p,K_p})]^T$ and $\dot{\tilde{z}}_a^h=[\dot{\tilde{z}}_a^h(t_k+T_{p,1}) \ldots \dot{\tilde{z}}_a^h(t_k+T_{p,K_p})]^T$ are used, which are predicted at the time $t_k$ over a complete time horizon with $K_p$ time steps and are calculated with the corresponding prediction time, e.g. by the algorithm described in DE 10 2008 024 513.

Considering the constraints valid by $k_l$, $v_{max}$, and $a_{max}$, an optimum time sequence thereupon can be determined for the compensation movement.

However, analogous to the model-predictive control only the first value of the trajectory calculated thereby is used for the subsequent control. In the next time step, the optimization is repeated with an updated and therefore more accurate prediction of the vertical position and velocity of the cable suspension point.

The advantage of the model-predictive trajectory generation with successive control as compared to a classical model-predictive control on the one hand consists in that the control part and the related stabilization can be calculated with a higher scan time as compared to the trajectory generation. Therefore, the calculation-intensive optimization can be shifted into a slower task.

In this concept, on the other hand, an emergency operation can be realized independent of the control for the case that the optimization does not find a valid solution. It consists of a simplified trajectory planning which the control relies upon in such emergency situation and further actuates the winch.

System Model for Planning the Compensation Movement

To satisfy the requirements of the steadiness of the reference trajectories for the compensation movement, its third derivative $\dddot{y}_a^*$ at the earliest can be regarded as jump-capable. However, jumps in the jerk should be avoided in the compensation movement with regard to the winch life, whereby only the fourth derivative $\overset{(4)}{y}{}_a^*$ can be regarded as jump-capable.

Figure 3:
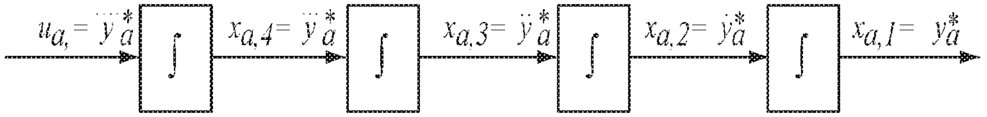
FIG. 3 shows a fourth order integrator chain for planning trajectories with steady jerk.

Thus, the jerk $\dddot{y}_a^*$ must at least be planned steady and the trajectory generation for the compensation movement is effected with reference to the fourth order integrator chain illustrated in FIG. 3. In the optimization, the same serves as system model and can be expressed as $$\dot{x}_a = \underbrace{\begin{bmatrix} 0 & 1 & 0 & 0 \\ 0 & 0 & 1 & 0 \\ 0 & 0 & 0 & 1 \\ 0 & 0 & 0 & 0 \end{bmatrix}}_{A_a} x_a + \underbrace{\begin{bmatrix} 0 \\ 0 \\ 0 \\ 1 \end{bmatrix}}_{B_a} u_a, \qquad (1.1)$$

$$x_a(0) = x_{a,0},$$

$$y_a = x_a$$

in the state space. Here, the output $y_a[y_a^*, \dot{y}_y^*, \ddot{y}_a^*, \dddot{y}_a^*]^T$ includes the planned trajectories for the compensation movement. For formulating the optimal control problem and with regard to the future implementation, this time-continuous model initially is discretized on the lattice $$\tau_0<\tau_1< \ldots <\tau_{K_p-1}<\tau_{K_p} \qquad (1.2)$$

wherein $K_p$ represents the number of the prediction steps for the prediction of the vertical movement of the cable suspension point. To distinguish the discrete time representation in the trajectory generation from the discrete system time $t_k$, it is designated with $\tau_k=k\Delta\tau$, wherein $k=0, \ldots, K_p$ and $\Delta\tau$ is the discretization interval of the horizon $K_p$ used for the trajectory generation.

Figure 4:
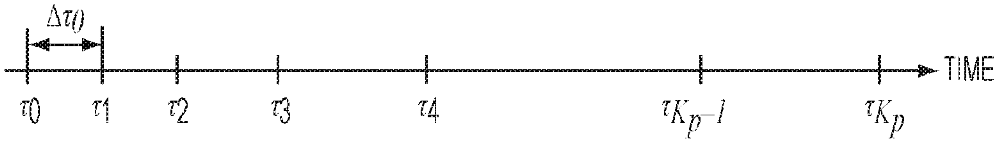
FIG. 4 shows a non-equidistant discretization for trajectory planning, which towards the end of the time horizon uses larger distances than at the beginning of the time horizon.

FIG. 4 illustrates that the chosen lattice is non-equidistant, so that the number of the necessary supporting points on the horizon is reduced. Thus, it is possible to keep the dimension of the optimal control problem to be solved small. The influence of the rougher discretization towards the end of the horizon has no disadvantageous effects on the planned trajectory, since the prediction of the vertical position and velocity is less accurate towards the end of the prediction horizon.

The time-discrete system representation valid for this lattice can be calculated exactly with reference to the analytical solution $$x_a(t) = e^{A_a t}x_a(0) + \int_0^t e^{A_a(t-\tau)}B_a u_a(\tau)\,d\tau \qquad (1.3)$$

For the integrator chain from FIG. 3 it follows to $$x_a(\tau_{k+1}) = \begin{bmatrix} 1 & \Delta\tau_k & \frac{\Delta\tau_k^2}{2} & \frac{\Delta\tau_k^1}{6} \\ 0 & 1 & \Delta\tau_k & \frac{\Delta\tau_k^2}{2} \\ 0 & 0 & 1 & \Delta\tau_k \\ 0 & 0 & 0 & 1 \end{bmatrix} + \begin{bmatrix} \frac{\Delta\tau_k^4}{24} \\ \frac{\Delta\tau_k^3}{6} \\ \frac{\Delta\tau_k^2}{2} \\ \Delta\tau_k \end{bmatrix} u_a(\tau_k), \tag{1.4}$$

$$x_a(0) = x_{a,0},$$

$$y_a(\tau_k) = x_a(\tau_k),$$

$$k = 0, \ldots, K_p - 1,$$

wherein $\Delta\tau_k = \tau_{k+1} - \tau_k$ describes the discretization step width valid for the respective time step.

Formulation and Solution of the Optimal Control Problem

By solving the optimal control problem a trajectory will be planned, which as closely as possible follows the predicted vertical movement of the cable suspension point and at the same time satisfies the given constraints.

To satisfy this requirement, the merit operation reads as follows:

$$J = \frac{1}{2}\sum_{k=1}^{K_p} \{[y_a(\tau_k) - w_a(\tau_k)]^T Q_w(\tau_k)[y_a(\tau_k) - w_a(\tau_k)] + u_a(\tau_{k-1}) r_u u_a(\tau_{k-1})\} \tag{1.5}$$

wherein $w_a(\tau_k)$ designates the reference valid at the respective time step. Since only the predicted position $\tilde{z}_a^h(t_k+T_{p,k})$ and velocity $\dot{\tilde{z}}_a^h(t_k+T_{p,k})$ of the cable suspension point are available here, the associated acceleration and the jerk are set to zero. The influence of this inconsistent specification, however, can be kept small by a corresponding weighting of the acceleration and jerk deviation. Thus:

$$w_a(\tau_k) = [\tilde{z}_a^h(t_k+T_{p,k}) \dot{\tilde{z}}_a^h(t_k+T_{p,k}) 0\ 0]^T, k=1, \ldots, K_p. \tag{1.6}$$

Over the Positively Semidefinite Diagonal Matrix $$Q_w(\tau_k = \mathrm{diag}(q_{w,1}(\tau_k), q_{w,2}(\tau_k), q_{w,3}, q_{w,4}), k=1, \ldots, K_p \tag{1.7}$$

deviations from the reference are weighted in the merit operation. The scalar factor $r_u$ evaluates the correction effort. While $r_u$, $q_{w,3}$ and $q_{w,4}$ are constant over the entire prediction horizon, $q_{w,r}$ and $q_{w,2}$ are chosen in dependence on the time step $\tau_k$. Reference values at the beginning of the prediction horizon therefore can be weighted more strongly than those at the end. Hence, the accuracy of the vertical movement prediction decreasing with increasing prediction time can be depicted in the merit operation. Because of the non-existence of the references for the acceleration and the jerk, the weights $q_{w,3}$ and $q_{w,4}$ only punish deviations from zero, which is why they are chosen smaller than the weights for the position $q_{w,1}(\tau_k)$ and velocity $q_{w,2}(\tau_k)$.

The associated constraints for the optimal control problem follow from the available power of the drive and the currently chosen weighting factor $k_l$ (cf. FIG. 2). Accordingly, it applies for the states of the system model from (1.4):

$$-\delta_a(\tau_k)(1-k_l)v_{max} \le x_{a,2}(\tau_k \le \delta_a(\tau_k)(1-k_l)v_{max},$$

$$-\delta_a(\tau_k)(1-k_l)a_{max} \le x_{a,3}(\tau_k) \le \delta_a(\tau_k)(1-k_l)a_{max}, \quad k=1, \ldots, K_p,$$

$$-\delta_a(\tau_k)j_{max} \le x_{a,4}(\tau_k) \le \delta_a(\tau_k)j_{max} \tag{1.8}$$

and for the input:

$$-\delta_a(\tau_k)\frac{d}{dt}j_{max} \le u_a(\tau_k) \le \delta_a(\tau_k)\frac{d}{dt}j_{max}, \tag{1.9}$$

$$k = 0, \ldots, K_p - 1.$$

Here, $\delta_a(\tau_k)$ represents a reduction factor which is chosen such that the respective constraint at the end of the horizon amounts to 95% of that at the beginning of the horizon. For the intermediate time steps, $\delta_a(\tau_k)$ follows from a linear interpolation. The reduction of the constraints along the horizon increases the robustness of the method with respect to the existence of admissible solutions.

While the velocity and acceleration constraints can change in operation, the constraints of the jerk $j_{max}$ and the derivative of the jerk $$\frac{d}{dt}j_{max}$$

are constant. To increase the useful life of the hoisting winch and the entire crane, they are chosen with regard to a maximum admissible shock load. For the positional state no constraints are applicable.

Since the maximum velocity $v_{max}$ and acceleration $a_{max}$ as well as the weighting factor of the power $k_l$ in operation are determined externally, the velocity and acceleration constraints also are changed necessarily for the optimal control problem. The presented concept takes account of the related time-varying constraints as follows: As soon as a constraint is changed, the updated value first is taken into account only at the end of the prediction horizon for the time step $\tau_{K_p}$. With progressing time, it is then pushed to the beginning of the prediction horizon.

Figure 5:
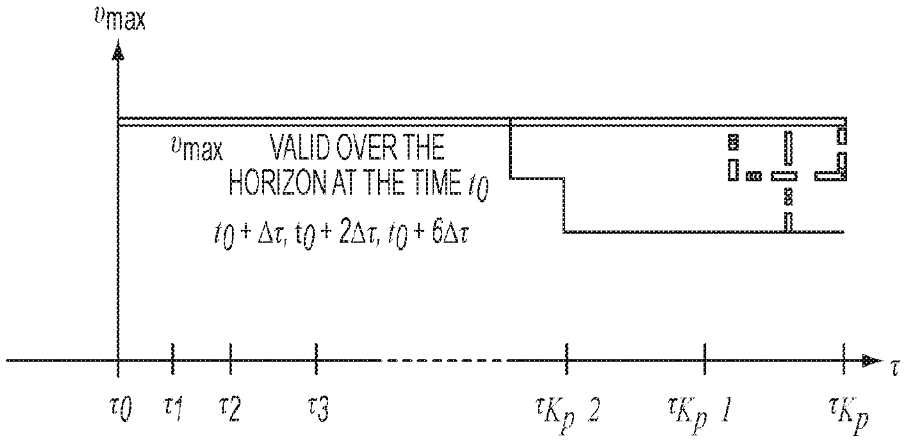
FIG. 5 shows how changing constraints first are taken into account at the end of the time horizon using the example of velocity.

FIG. 5 illustrates this procedure with reference to the velocity constraint. When reducing a constraint, care should be taken in addition that it fits with its maximum admissible derivative. This means that for example the velocity constraint $(1-k_l)v_{max}$ maximally can be reduced as fast as is allowed by the current acceleration constraint $(1-k_l)a_{max}$. Because the updated constraints are pushed through, there always exists a solution for an initial condition $x_a(\tau_0)$ present in the constraints, which in turn does not violate the updated constraints. However, it will take the complete prediction horizon, until a changed constraint finally influences the planned trajectories at the beginning of the horizon.

Thus, the optimal control problem is completely given by the quadratic merit operation (1.5) to be minimized, the system model (1.4) and the inequality constraints from (1.8) and (1.9) in the form of a linear-quadratic optimization problem (QP problem for Quadratic Programming Problem). When the optimization is carried out for the first time, the initial condition is chosen to be $x_a(\tau_0)=[0,0,0,0]^T$. Subsequently, the value $x_a(\tau_1)$ calculated for the time step $\tau_1$ in the last optimization step is used as initial condition.

At each time step, the calculation of the actual solution of the QP problem is effected via a numerical method which is referred to as QP solver.

Due to the calculation effort for the optimization, the scan time for the trajectory planning of the compensation movement is greater than the discretization time of all remaining components of the active heave compensation; thus: $\Delta\tau > \Delta t$.

To ensure that the reference trajectories are available for the control at a faster rate, the simulation of the integrator chain from FIG. 3 takes place outside the optimization with the faster scan time $\Delta t$. As soon as new values are available from the optimization, the states $x_a(\tau_0)$ are used as initial condition for the simulation and the correcting variable at the beginning of the prediction horizon $u_a(\tau_0)$ is written on the integrator chain as constant input.

Reference Trajectories for Moving the Load

Analogous to the compensation movement, two times steadily differentiable reference trajectories are necessary for the superimposed hand lever control (cf. FIG. 2). As with these movements specifiable by the crane operator, no fast changes in direction normally are to be expected for the winch, the minimum requirement of a steadily planned acceleration $\ddot{y}_l^*$ also was found to be sufficient with respect to the useful life of the winch. Thus, in contrast to the reference trajectories planned for the compensation movement, the third derivative $\dddot{y}_a^*$, which corresponds to the jerk, already can be regarded as jump-capable.

Figure 6:
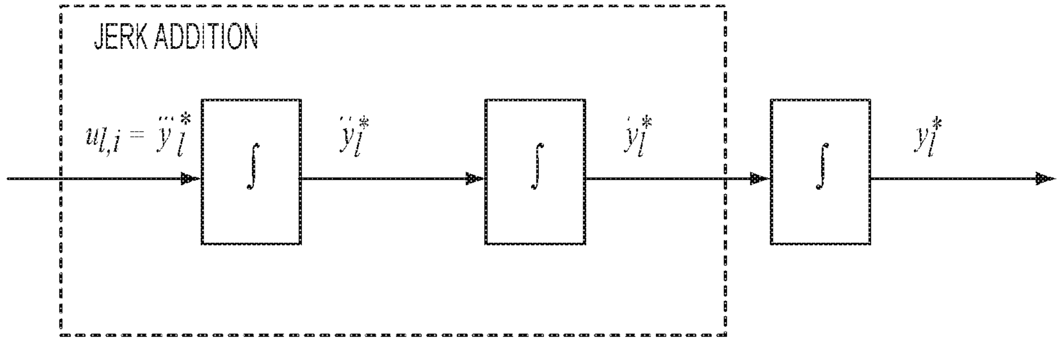
FIG. 6 shows the third order integrator chain used for the trajectory planning of the operator control, which works with reference to a jerk addition.

As shown in FIG. 6, it also serves as input of a third order integrator chain. Beside the requirements as to steadiness, the planned trajectories also must satisfy the currently valid velocity and acceleration constraints, which for the hand lever control are found to be $k_l v_{max}$ and $k_l a_{max}$.

Figure 7:
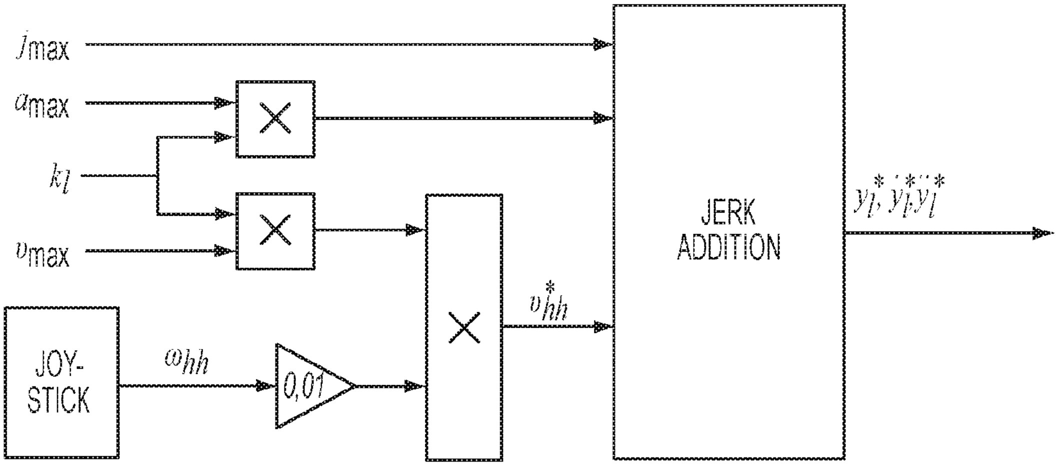
FIG. 7 shows the structure of the path planning of the operator control, which takes account of constraints of the drive.

The hand lever signal of the crane operator $-100 \le w_{hh} \le 100$ is interpreted as relative velocity specification with respect to the currently maximum admissible velocity $k_l v_{max}$. Thus, according to FIG. 7 the target velocity specified by the hand lever is $$v_{hh}^* = k_l v_{max} \frac{w_{hh}}{100}. \tag{1.10}$$

As can be seen, the target velocity currently specified by the hand lever depends on the hand lever position $w_{hh}$, the variable weighting factor $k_l$ and the current maximum admissible winch speed $v_{max}$.

The task of trajectory planning for the hand lever control now can be indicated as follows: From the target velocity specified by the hand lever, a steadily differentiable velocity profile can be generated, so that the acceleration has a steady course. As procedure for this task a so-called jerk addition is recommendable.

The basic idea is that in a first phase the maximum admissible jerk $j_{max}$ acts on the input of the integrator chain, until the maximum admissible acceleration is reached. In the second phase, the speed is increased with constant acceleration; and in the last phase the maximum admissible negative jerk is added such that the desired final speed is achieved.

Figure 8:
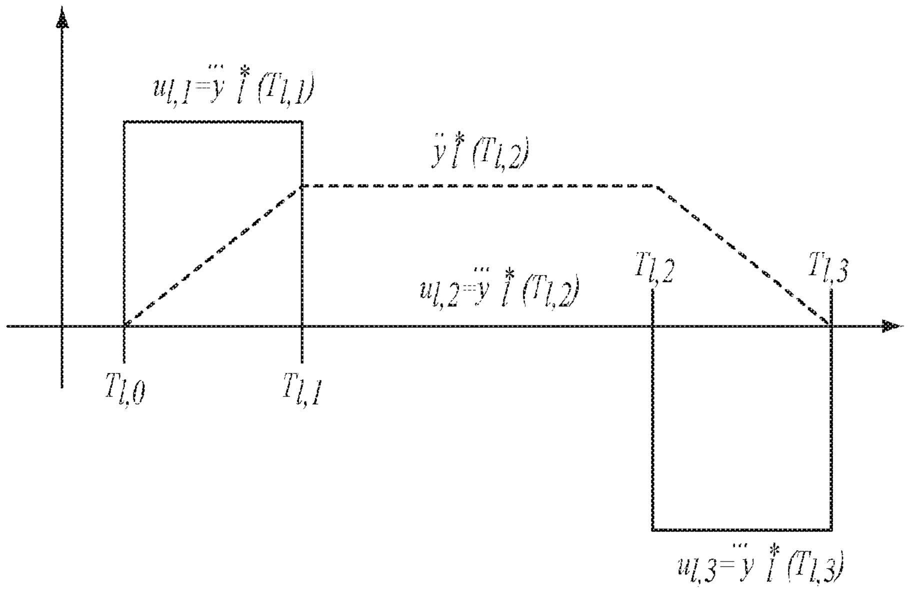
FIG. 8 shows an exemplary jerk profile with associated switching times, from which a trajectory for the position and/or velocity and/or acceleration of the hoisting gear is calculated with reference to the path planning.

Therefore, merely the switching times between the individual phases must be determined in the jerk addition. FIG. 8 shows an exemplary course of the jerk for a speed change together with the switching times. $T_{1,0}$ designates the time at which replanning takes place. The times $T_{1,1}$, $T_{1,2}$ and $T_{1,3}$ each refer to the calculated switching times between the individual phases. Their calculation is outlined in the following paragraph.

As soon as a new situation occurs for the hand lever control, replanning of the generated trajectories takes place. A new situation occurs as soon as the target velocity $v_{hh}^*$ or the currently valid maximum acceleration for the hand lever control $k_l a_{max}$ is changed. The target velocity can change due to a new hand lever position $w_{hh}$ or due to a new specification of $k_l$ or $v_{max}$ (cf. FIG. 7). Analogously, a variation of the maximum valid acceleration by $k_l$ or $a_{max}$ is possible.

When replanning the trajectories, that velocity initially is calculated from the currently planned velocity $\dot{y}_l^*(T_{1,0})$ and the corresponding acceleration $\ddot{y}_l^*(T_{1,0})$ which is obtained with a reduction of the acceleration to zero:

$$\tilde{v} = \dot{y}_l^*(T_{l,0}) + \Delta\tilde{T}_1 \ddot{y}_l^*(T_{l,0}) + \frac{1}{2}\Delta\tilde{T}_1^2 \tilde{u}_{l,1}, \tag{1.11}$$

wherein the minimum necessary time is given by $$\Delta\tilde{T}_1 = -\frac{\ddot{y}_l^*}{\tilde{u}_{l,1}}, \quad \tilde{u}_{l,1} \neq 0 \tag{1.12}$$

and $\tilde{u}_{l,1}$ designates the input of the integrator chain, i.e. the added jerk (cf. FIG. 6): In dependence on the currently planned acceleration $\ddot{y}_l^*(T_{1,0})$ it is found to be $$\tilde{u}_{l,1} = \begin{cases} j_{max}, & \text{for } \ddot{y}_l^* < 0 \\ -j_{amx}, & \text{for } \ddot{y}_l^* > 0\,. \\ 0, & \text{for } \ddot{y}_l^* = 0 \end{cases} \tag{1.13}$$

In dependence on the theoretically calculated velocity and the desired target velocity, the course of the input now can be indicated. If $v_{hh}^* > \tilde{v}$, $\tilde{v}$ does not reach the desired value $v_{hh}^*$ and the acceleration can be increased further. However, if $v_{hh}^* < \tilde{v}$, $\tilde{v}$ is too fast and the acceleration must be reduced immediately.

From these considerations, the following switching sequences of the jerk can be derived for the three phases:

$$u_l = \begin{cases} [j_{max} \quad 0 \quad -j_{max}], & \text{for } \tilde{v} \le v_{hh}^* \\ [-j_{max} \quad 0 \quad j_{max}], & \text{for } \tilde{v} > v_{hh}^* \end{cases} \tag{1.14}$$

with $u_l = [u_{l,1}, u_{l,2}, u_{l,3}]$ and the input signal $u_{l,i}$ added in the respective phase. The duration of a phase is found to be $\Delta T_i = T_{l,i} - T_{l,i-1}$ with i=1, 2, 3. Accordingly, the planned velocity and acceleration at the end of the first phase are:

$$\dot{y}_l^*(T_{l,1}) = \dot{y}_l^*(T_{l,0}) + \Delta T_1 \ddot{y}_l^*(T_{l,0}) + \frac{1}{2}\Delta T_1^2 u_{l,1}, \tag{1.15}$$

$$\ddot{y}_l^*(T_{l,1}) = \ddot{y}_l^*(T_{l,0}) + \Delta T_1 u_{l,1} \tag{1.16}$$

and after the second phase:

$$\dot{y}_l^*(T_{l,2}) = \dot{y}_l^*(T_{l,1}) + \Delta T_2 \ddot{y}_l^*(T_{l,1}), \tag{1.17}$$

$$\ddot{y}_l^*(T_{l,2}) = \ddot{y}_l^*(T_{l,1}), \tag{1.18}$$

wherein $u_{l,2}$ was assumed=0. After the third phase, finally, it follows:

$$\dot{y}_l^*(T_{l,3}) = \dot{y}_l^*(T_{l,2}) + \Delta T_3 \ddot{y}_l^*(T_{l,2}) + \frac{1}{2}\Delta T_3^2 u_{l,3}, \tag{1.19}$$

$$\ddot{y}_l^*(T_{l,3}) = \ddot{y}_l^*(T_{l,2}) + \Delta T_3 u_{l,3}. \tag{1.20}$$

For the exact calculation of the switching times $T_{l,i}$ the acceleration constraint initially is neglected, whereby $\Delta T_2=0$. Due to this simplification, the lengths of the two remaining time intervals can be indicated as follows:

$$\Delta T_1 = \frac{\tilde{a} - \ddot{y}_l^*(T_{l,0})}{u_{l,1}}, \tag{1.21}$$

$$\Delta T_3 = \frac{0 - \tilde{a}}{u_{l,3}}, \tag{1.22}$$

wherein ã stands for the maximum acceleration achieved. By inserting (1.21) and (1.22) into (1.15), (1.16) and (1.19) a system of equations is obtained, which can be resolved for ã. Considering $\dot{y}_l^*(T_{l,3})=v_{hh}^*$, the following finally is obtained:

$$\tilde{a} = \pm\sqrt{\frac{u_{l,3}[2\dot{y}_l^*(T_{l,0})u_{l,1} - \ddot{y}_l^*(T_{l,0})^2 - 2v_{hh}^* u_{l,1}]}{u_{l,1} - u_{l,3}}}. \tag{1.23}$$

The sign of ã follows from the condition that $\Delta T_1$ and $\Delta T_3$ in (1.21) and (1.22) must be positive.

In a second step, ã and the maximum admissible acceleration $k_l a_{max}$ result in the actual maximum acceleration:

$$\bar{a}=\ddot{y}_l^*(T_{l,1})=\ddot{y}_l^*(T_{l,2})=\min\{k_l a_{max},\max\{-k_l a_{max},\tilde{a}\}\}. \tag{1.24}$$

With the same, the really occurring time intervals $\Delta T_1$ and $\Delta T_3$ finally can be calculated. They result from (1.21) and (1.22) with ã=ā. The yet unknown time interval $\Delta T_2$ now is determined from (1.17) and (1.19) with $\Delta T_1$ and $\Delta T_3$ from (1.21) and (1.22) to be $$\Delta T_2 = \frac{2v_{hh}^* u_{l,3} + \bar{a}^2 - 2\dot{y}_l^*(T_{l,1})u_{l,3}}{2\bar{a}u_{l,3}}, \tag{1.25}$$

wherein $\dot{y}_l^*(T_{l,1})$ follows from (1.15). The switching times can directly be taken from the time intervals:

$$T_{l,i}=T_{l,i-1}+\Delta T_i, i=1,2,3. \tag{1.26}$$

The velocity and acceleration profiles $\dot{y}_l^*$ and $\ddot{y}_l^*$ to be planned can be calculated analytically with the individual switching times. It should be mentioned that the trajectories planned by the switching times frequently are not traversed completely, since before reaching the switching time $T_{1,3}$ a new situation occurs, replanning thereby takes place and new switching times must be calculated. As mentioned already, a new situation occurs by a change in $w_{hh}$, $v_{max}$, $a_{max}$ or $k_l$.

Figure 9:
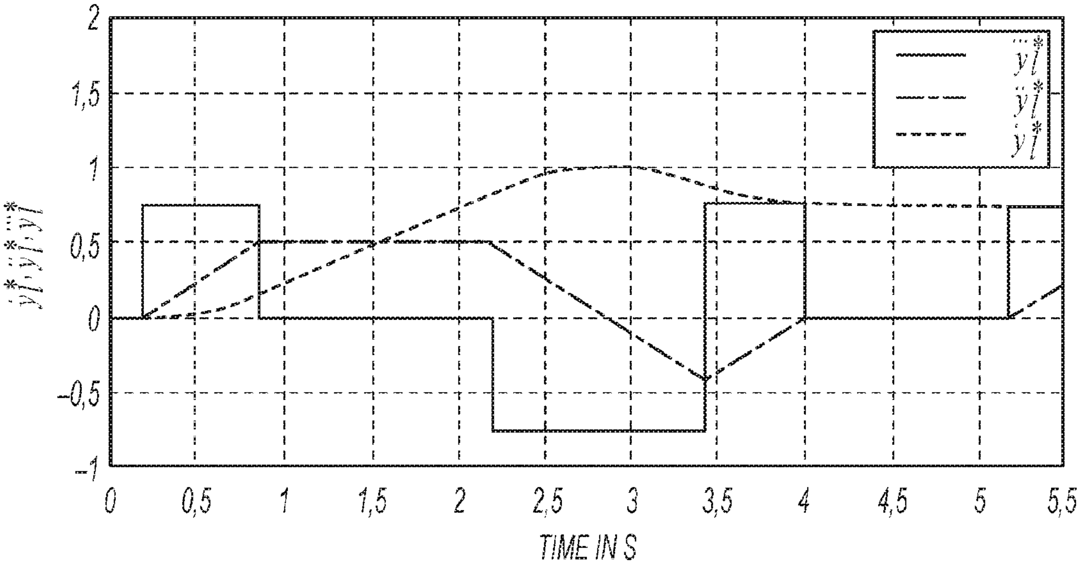
FIG. 9 shows a course of a velocity and acceleration trajectory generated with the jerk addition.

FIG. 9 shows a trajectory generated via the presented method by way of example. The course of the trajectories includes both cases which can occur due to (1.24). In the first case, the maximum admissible acceleration is reached at the time t=1 s, followed by a phase with constant acceleration. The second case occurs at the time t=3.5 s. Here, the maximum admissible acceleration is not reached completely due to the hand lever position. The consequence is that the first and the second switching time coincide, and $\Delta T_2=0$ applies. According to FIG. 6, the associated position course is calculated by integration of the velocity curve, wherein the position at system start is initialized by the cable length currently unwound from the hoisting winch.

Actuation Concept for the Hoisting Winch

Figure 10:
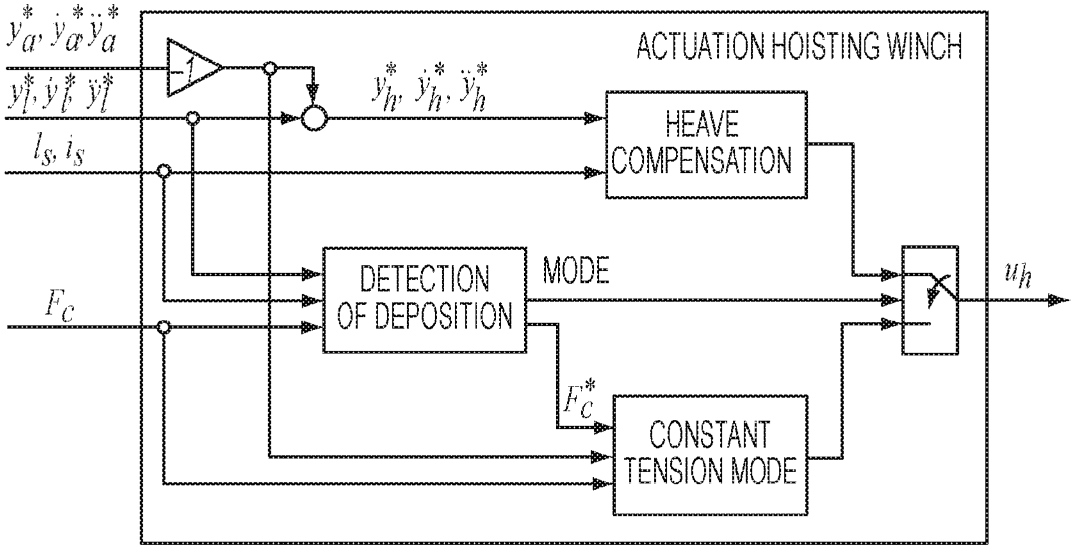
FIG. 10 shows an overview of the actuation concept with an active heave compensation and a target force mode, here referred to as constant tension mode.

In principle, the actuation consists of two different operating modes: the active heave compensation for decoupling the vertical load movement from the ship movement with free-hanging load and the constant tension control for avoiding a slack cable, as soon as the load is deposited on the sea bed. During a deep-sea lift, the heave compensation initially is active. With reference to a detection of the depositing operation, switching to the constant tension control is effected automatically. FIG. 10 illustrates the overall concept with the associated reference and control variables.

Each of the two different operating modes however might also be implemented each without the other operating mode. Furthermore, a constant tension mode as it will be described below can also be used independent of the use of the crane on a ship and independent of an active heave compensation.

Due to the active heave compensation, the hoisting winch should be actuated such that the winch movement compensates the vertical movement of the cable suspension point $z_a^h$ and the crane operator moves the load by the hand lever in the h coordinate system regarded as inertial. To ensure that the actuation has the required predictive behavior for minimizing the compensation error, it is implemented by a pilot control and stabilization part in the form of a structure of two degrees of freedom. The pilot control is calculated from a differential parameterization by the flat output of the winch dynamics and results from the planned trajectories for moving the load $y_l^*$, $\dot{y}_l^*$ and $\ddot{y}_l^*$ as well as the negative trajectories for the compensation movement $-y_a^*$, $-\dot{y}_a^*$ and $-\ddot{y}_a^*$ (cf. FIG. 10). The resulting target trajectories for the system output of the drive dynamics and the winch dynamics are designated with $y_h^*$, $\dot{y}_h^*$ and $\ddot{y}_h^*$. They represent the target position, velocity and acceleration for the winch movement and thereby for the winding and unwinding of the cable.

During the constant tension phase, the cable force at the load $F_{sl}$ is to be controlled to a constant amount, in order to avoid a slack cable. The hand lever therefore is deactivated in this operating mode, and the trajectories planned on the basis of the hand lever signal no longer are added. The actuation of the winch in turn is effected by a structure of two degrees of freedom with pilot control and stabilization part.

The exact load position $z_l$ and the cable force at the load $F_{sl}$ are not available as measured quantities for the control, since due to the long cable lengths and great depths the crane hook is not equipped with a sensor unit. Furthermore, no information exists on the kind and shape of the suspended load. Therefore, the individual load-specific parameters such as load mass $m_l$, coefficient of the hydrodynamic increase in mass $C_a$, coefficient of resistance $C_d$ and immersed volume $\nabla_l$, are not known in general, whereby a reliable estimation of the load position is almost impossible in practice.

Thus, merely the unwound cable length $l_s$ and the associated velocity $\dot{l}_s$ as well as the force at the cable suspension point $F_c$ are available as measured quantities for the control. The length $l_s$ is obtained indirectly from the winch angle $\phi_h$ measured with an incremental encoder and the winch radius $r_h(j_l)$ dependent on the winding layer $j_l$. The associated cable velocity $\dot{l}_s$ can be calculated by numerical differentiation with suitable low-pass filtering. The cable force $F_c$ applied to the cable suspension point is detected by a force measuring pin.

Actuation for the Active Heave Compensation

Figure 11:
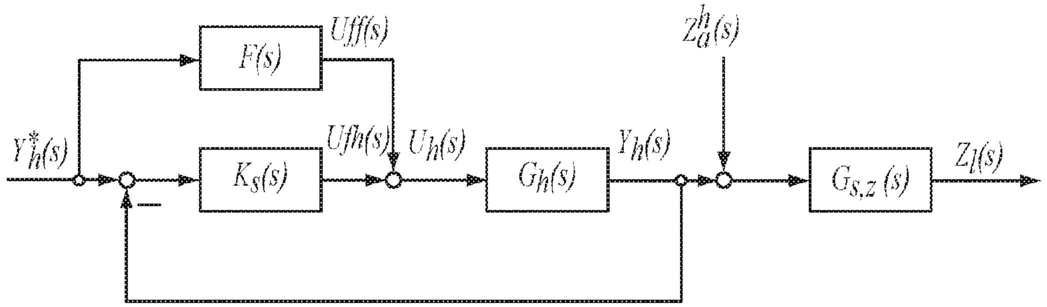
FIG. 11 shows a block circuit diagram of the actuation for the active heave compensation.

FIG. 11 illustrates the actuation of the hoisting winch for the active heave compensation with a block circuit diagram in the frequency range. As can be seen, there is only effected a feedback of the cable length and velocity $y_h = l_s$ and $\dot{y}_h = \dot{l}_s$ from the partial system of the drive $G_h(s)$. As a result, the compensation of the vertical movement of the cable suspension point $Z_a^h(s)$ acting on the cable system $G_{s,z}(s)$ as input interference takes place purely as pilot control; cable and load dynamics are neglected. Due to a non-complete compensation of the input interference or a winch movement, the inherent cable dynamics is incited, but in practice it can be assumed that the resulting load movement is greatly attenuated in water and decays very fast.

The transfer operation of the drive system from the correcting variable $U_h(s)$ to the unwound cable length $Y_h(s)$ can be approximated as $IT_l$ system and results in $$G_h(s) = \frac{Y_h(s)}{U_h(s)} = \frac{K_h r_h(j_l)}{T_h s^2 + s} \tag{2.1}$$

with the winch radius $r_h(j_l)$. Since the system output $Y_h(s)$ at the same time represents a flat output, the inverting pilot control F(s) will be $$F(s) = \frac{U_{ff}(s)}{Y_h^*(s)} = \frac{1}{G_h(s)} = \frac{T_h}{K_h r_h(j_l)} s^2 + \frac{1}{K_h r_h(j_l)} s \tag{2.2}$$

and can be written in the time domain in the form of a differential parameterization as $$u_{ff}(t) = \frac{T_h}{K_h r_h(j_l)} \ddot{y}_h^*(t) + \frac{1}{K_h r_h(j_l)} \dot{y}_h^*(t) \tag{2.3}$$

(2.3) shows that the reference trajectory for the pilot control must be steadily differentiable at least two times.

The transfer operation of the closed circuit, consisting of the stabilization $K_a(s)$ and the winch system $G_h(s)$, can be taken from FIG. 11 to be $$G_{AHC}(s) = \frac{K_a(s) G_h(s)}{1 + K_a(s) G_h(s)} \tag{2.4}$$

By neglecting the compensation movement $Y_a^*(s)$, the reference variable $Y_h^*(s)$ can be approximated as ramp-shaped signal with a constant or stationary hand lever deflection, as in such a case a constant target velocity $v_{hh}^*$ exists. To avoid a stationary control deviation in such reference variable, the open chain $K_a(s)G_h(s)$ therefore must show a $I_2$ behavior [9]. This can be achieved for example by a PID controller with $$K_a(s) = \frac{T_h}{K_h r_h(j_l)} \left( \frac{\kappa_{AHC,0}}{s} + \kappa_{AHC,1} + \kappa_{AHC,2} s \right), \ \kappa_{AHC,i} > 0 \tag{2.5}$$

Hence it follows for the closed circuit:

$$G_{AHC}(s) = \frac{\kappa_{AHC,0} + \kappa_{AHC,1} s + \kappa_{AHC,2} s^2}{s^3 + \left( \frac{1}{T_h} + \kappa_{AHC,2} \right) s^2 + \kappa_{AHC,1} s + \kappa_{AHC,0}}, \tag{2.6}$$

wherein the exact values of $\Lambda_{ACH,i}$ are chosen in dependence on the respective time constant $T_h$.

Detection of the Depositing Operation

As soon as the load hits the sea bed, switching from the active heave compensation into the constant tension control should be effected. For this purpose, a detection of the depositing operation is necessary (cf. FIG. 10). For the same and the subsequent constant tension control, the cable is approximated as simple spring-mass element. Thus, the force acting at the cable suspension point approximately is calculated as follows $$F_c = k_c \Delta l_c, \tag{2.7}$$

wherein $k_c$ and $\Delta l_c$ designate the spring constant equivalent to the elasticity of the cable and the deflection of the spring. For the latter, it applies:

$$\Delta l_c = \int_0^l \varepsilon_s(\bar{s}, t)\, d\bar{s} = \bar{z}_{s,stat}(1) - \tilde{z}_{s,stat}(0) - l_s = \frac{g l_s}{E_s A_s} \left( m_e + \frac{1}{2} \mu_s l_s \right). \tag{2.8}$$

The equivalent spring constant $k_c$ can be determined from the following stationary observation. For a spring loaded with the mass $m_f$ it applies in the stationary case:

$$k_c \Delta l_c = m_f g. \tag{2.9}$$

A transformation of (2.8) results in $$\frac{E_s A_s}{l_s} \Delta l_c = \left( m_e + \frac{1}{2} \mu_s l_s \right) g. \tag{2.10}$$

With reference to a coefficient comparison between (2.9) and (2.10) the equivalent spring constant can be read as $$k_c = \frac{E_s A_s}{l_s} \tag{2.11}$$

In (2.9) it can also be seen that the deflection of the spring $\Delta l_c$ in the stationary case is influenced by the effective load mass $m_e$ and half the cable mass $\frac{1}{2}\mu_s l_s$. This is due to the fact that in a spring the suspended mass $m_f$ is assumed to be concentrated in one point. The cable mass, however, is uniformly distributed along the cable length and therefore does not fully load the spring. Nevertheless, the full weight force of the cable $\mu_s l_s g$ is included in the force measurement at the cable suspension point.

With this approximation of the cable system, conditions for the detection of the depositing operation on the sea bed now can be derived. At rest, the force acting on the cable suspension point is composed of the weight force of the unwound cable $\mu_s l_s g$ and the effective weight force of the load mass $m_e g$. Therefore, the measured force $F_c$ with a load located on the sea bed approximately is $$F_c = (m_c + \mu_s l_s) g + \Delta F_c \tag{2.12}$$

with $$\Delta F_c = -k_c \Delta l_s, \tag{2.13}$$

wherein $\Delta l_s$ designates the cable unwound after reaching the sea bed. From (2.13) it follows that $\Delta l_s$ is proportional to the change of the measured force, since the load position is constant after reaching the ground. With reference to (2.12) and (2.13) the following conditions now can be derived for a detection, which must be satisfied at the same time:

The decrease of the negative spring force must be smaller than a threshold value:

$$\Delta F_c < \Delta \hat{F}_c. \tag{2.14}$$

The time derivative of the spring force must be smaller than a threshold value:

$$\dot{F}_c < \dot{\hat{F}}_c. \tag{2.15}$$

The crane operator must lower the load. This condition is checked with reference to the trajectory planned with the hand lever signal:

$$\dot{y}_l^* \geq 0. \tag{2.16}$$

To avoid a wrong detection on immersion into the water, a minimum cable length must be unwound:

$$l_s > l_{s,min}. \tag{2.17}$$

The decrease of the negative spring force $\Delta F_c$ each is calculated with respect to the last high point $\overline{F}_c$ in the measured force signal $F_c$. To suppress measurement noise and high-frequency interferences, the force signal is preprocessed by a corresponding low-pass filter.

Since the conditions (2.14) and (2.15) must be satisfied at the same time, a wrong detection as a result of a dynamic inherent cable oscillation is excluded: As a result of the dynamic inherent cable oscillation, the force signal $F_c$ oscillates, whereby the change of the spring force $\Delta F_c$ with respect to the last high point $\overline{F}_c$ and the time derivative of the spring force $\dot{F}_c$ have a shifted phase. Consequently, with a suitable choice of the threshold values $\Delta \hat{F}_c$ and $\dot{\hat{F}}_c$ in the case of a dynamic inherent cable oscillation, both conditions cannot be satisfied at the same time. For this purpose, the static part of the cable force must drop, as is the case on immersion into the water or on deposition on the sea bed. A wrong detection on immersion into the water, however, is prevented by condition (2.17).

The threshold value for the change of the spring force is calculated in dependence on the last high point in the measured force signal as follows:

$$\Delta \hat{F}_c = \min\{-\chi_1 \overline{F}_c, \Delta \hat{F}_{c,max}\}, \tag{2.18}$$

wherein $\chi_1 < 1$ and the maximum value $\Delta \hat{F}_{c,max}$ were determined experimentally. The threshold value for the derivative of the force signal $\dot{\hat{F}}_c$ can be estimated from the time derivative of (2.7) and the maximum admissible hand lever velocity $k_l v_{max}$ as follows $$\dot{\hat{F}} = \min\{-\chi_2 k_c k_l v_{max}, \dot{\hat{F}}_{c,max}\} \tag{2.19}$$

The two parameters $\chi_2 < 1$ and $\dot{\hat{F}}_{c,max}$ likewise were determined experimentally.

Since in the constant tension control a force control is applied instead of the position control, a target force $F_c^*$ is specified as reference variable in dependence on the sum of all static forces $F_{l,stat}$ acting on the load. For this purpose $F_{l,stat}$ is calculated in the phase of the heave compensation in consideration of the known cable mass $\mu_s l_s$:

$$F_{l,stat} = F_{c,stat} - \mu_s l_s g. \tag{2.20}$$

$F_{c,stat}$ designates the static force component of the measured force at the cable suspension point $F_c$. It originates from a corresponding low-pass filtering of the measured force signal. The group delay obtained on filtering is no problem, as merely the static force component is of interest and a time delay has no significant influence thereon. From the sum of all static forces acting on the load, the target force is derived taking into account the weight force of the cable additionally acting on the cable suspension point, as follows:

$$F_c^* = p_s F_{l,stat} + \mu_s l_s g, \tag{2.21}$$

wherein the resulting tension in the cable is specified by the crane operator with $0 < p_s < 1$. To avoid a setpoint jump in the reference variable, a ramp-shaped transition from the force currently measured on detection to the actual target force $F_c^*$ is effected after a detection of the depositing operation.

For picking up the load from the sea bed, the crane operator manually performs the change from the constant tension mode into the active heave compensation with free-hanging load.

Actuation for the Constant Tension Mode

Figure 12:
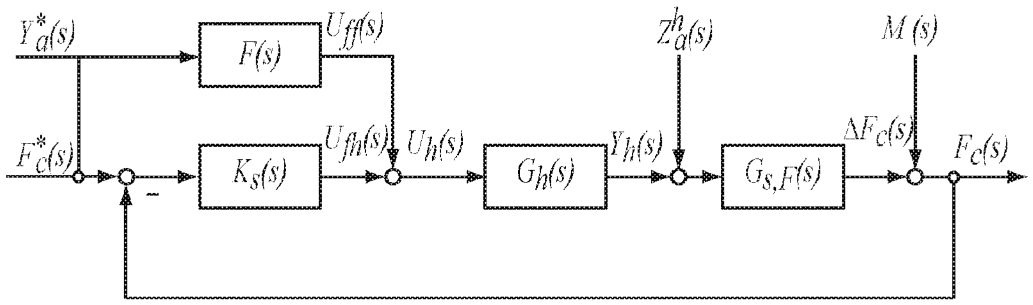
FIG. 12 shows a block circuit diagram of the actuation for the target force mode.

FIG. 12 shows the implemented actuation of the hoisting winch in the constant tension mode in a block circuit diagram in the frequency range. In contrast to the control structure illustrated in FIG. 11, the output of the cable system $F_c(s)$, i.e. the force measured at the cable suspension point, here is fed back instead of the output of the winch system $Y_h(s)$. According to (2.12), the measured force $F_c(s)$ is composed of the change in force $\Delta F_c(s)$ and the static weight force $m_e g + \mu_s l_s g$, which in the Figure is designated with M(s). For the actual control, the cable system in turn is approximated as spring-mass system.

The pilot control F(s) of the structure of two degrees of freedom is identical with the one for the active heave compensation and given by (2.2) and (2.3), respectively. In the constant tension mode, however, the hand lever signal is not added, which is why the reference trajectory only consists of the negative target velocity and acceleration $-\dot{y}_a^*$ and $\ddot{y}_a^*$ for the compensation movement. The pilot control part initially in turn compensates the vertical movement of the cable suspension point $Z_a^h(s)$. However, a direct stabilization of the winch position is not effected by a feedback of $Y_h(s)$. This is effected indirectly by the feedback of the measured force signal.

The measured output $F_c(s)$ is obtained from FIG. 12 as follows $$F_c(s) = G_{CT,1}(s)\underbrace{[Y_a^*(s)F(s)G_h(s) + Z_a^h(s)]}_{E_a(s)} + G_{CT,2}(s)F_c^*(s) \tag{2.22}$$

with the two transfer operations $$G_{CT,1}(s) = \frac{G_{s,F}(s)}{1 + K_s(s)G_h(s)G_{s,F}(s)}, \tag{2.23}$$

$$G_{CT,2}(s) = \frac{K_s(s)G_h(s)G_{s,F}(s)}{1 + K_s(s)G_h(s)G_{s,F}(s)}, \tag{2.24}$$

wherein the transfer operation of the cable system for a load standing on the ground follows from (2.12):

$$G_{s,F}(s) = -k_c. \tag{2.25}$$

As can be taken from (2.22), the compensation error $E_a(s)$ is corrected by a stable transfer operation $G_{CT,1}(s)$ and the winch position is stabilized indirectly. In this case, too, the requirement of the controller $K_s(s)$ results from the expected reference signal $F_c^*(s)$, which after a transition phase is given by the constant target force $F_c^*$ from (2.21). To avoid a stationary control deviation with such constant reference variable, the open chain $K_s(s)G_h(s)G_{s,F}(s)$ must have an I behavior. Since the transfer operation of the winch $G_h(s)$ already implicitly has such behavior, this requirement can be realized with a P feedback; thus, it applies:

$$K_s(s) = -\frac{T_h}{K_h \tau_h(j_l)} \kappa_{CT}, \quad (2.26)$$

$$\kappa_{CT} > 0.$$

The invention claimed is:

1. A crane controller for a crane which includes a hoisting gear for lifting a load hanging on a cable, comprising:

an active heave compensation which by actuating the hoisting gear at least partly compensates a movement of a cable suspension point and/or a load deposition point due to a heave, wherein the heave compensation takes account of at least one constraint of the hoisting gear when calculating the actuation of the hoisting gear, and wherein the heave compensation takes account of a maximum available velocity.

2. The crane controller according to claim 1, wherein the heave compensation takes account of a maximum admissible jerk.

3. The crane controller according to claim 1, wherein the heave compensation takes account of a maximum available acceleration.

4. The crane controller according to claim 1, wherein trajectory planning for compensation movement of a winch includes generating sufficiently smooth trajectories from predicted vertical positions and velocities of the cable suspension point taking into account valid drive constraints by solving an optimization at each time step of the crane controller.

5. The crane controller according to claim 1, wherein the heave compensation takes account of a maximum available power.

6. The crane controller according to claim 1, wherein the crane controller includes a calculation operation which calculates at least one constraint of the hoisting gear, including calculating a maximum available velocity and/or acceleration of the hoisting gear, wherein the calculation operation takes account of a length of an unwound cable and/or a cable force and/or a power available for driving the hoisting gear.

7. The crane controller according to claim 1, wherein the crane controller includes a calculation operation which calculates at least one constraint of the hoisting gear, wherein the calculation operation takes account of a cable force or a power available for driving the hoisting gear.

8. The crane controller according to claim 1, wherein a drive of the hoisting gear is connected with an energy accumulator.

9. The crane controller according to claim 8, including a path planning module which determines a trajectory with reference to a predicted movement of the cable suspension point and/or the load deposition point and by taking account of the constraint of the hoisting gear, wherein the path planning module includes an optimization operation which determines a trajectory with reference to the predicted movement of the cable suspension point and/or the load deposition point and by taking account of the constraint of the hoisting gear, including reducing a residual movement of the load due to the movement of the cable suspension point and/or the load deposition point.

10. A crane controller including a computer readable storage medium with instructions stored therein, the instructions comprising:

an active heave compensation with instructions for actuating a hoisting gear at least partly based on one or more of a movement of a cable suspension point and a load deposition point due to a heave to thereby compensate the movements, wherein the heave compensation takes account of at least one constraint of the hoisting gear when calculating the actuation of the hoisting gear and includes instructions for a path planning module which with reference to a predicted movement of one or more of the cable suspension point and the load deposition point calculates a trajectory of one or more of a position, velocity, and acceleration of the hoisting gear, which is included in a setpoint value for a subsequent control of the hoisting gear.

11. The crane controller according to claim 10, wherein the controller of the hoisting gear includes instructions for feeding back measured values of the position and velocity of the hoisting gear and wherein the actuation of the hoisting gear takes account of dynamics of a drive of the hoisting gear by a pilot control.

12. The crane controller according to claim 11, further comprising an operator control and instructions for actuating the hoisting gear with reference to an operator control input, wherein the instructions include two separate path planning modules via which trajectories for the heave compensation and for the operator control are calculated separate from each other, wherein furthermore the trajectories specified by the two separate path planning modules are added up and serve as setpoint values for the control of the hoisting gear.

13. The crane controller according to claim 12, wherein a division of at least one kinematically constrained quantity between heave compensation and operator control is adjustable depending on operating conditions, wherein the adjustment is effected by at least one weighting factor by which one or more of a maximum available power, velocity, and acceleration of the hoisting gear is split up between the heave compensation and the operator control.

14. The crane controller according to claim 13, wherein an optimization operation of the heave compensation determines a target trajectory which is included in the control of the hoisting gear, wherein the optimization operation is effected at each time step on a basis of an updated prediction of the movement of the cable suspension point.

15. The crane controller according to claim 13, wherein an optimization operation of the heave compensation determines a target trajectory which is included in the control of the hoisting gear, wherein a first value of the target trajectory is used for the control and/or regulation.

16. The crane controller according to claim 13, wherein an optimization operation of the heave compensation determines a target trajectory which is included in the control of the hoisting gear, wherein the optimization operation works with a greater scan time than the control wherein the optimization operation includes an emergency trajectory planning when no valid solution is found.

17. The crane controller according to claim 10, further comprising a measuring device which determines a current heave movement from sensor data and prediction instructions which predict a future movement of the cable suspension point and the load deposition point with reference to the determined current heave movement and a model of the heave movement, wherein the model of the heave movement is independent of dynamics of a pontoon on which the crane and/or the load deposition point is arranged.

18. The crane controller according to claim 17, wherein the prediction instructions determine prevailing modes of the heave movement from the data of the measuring device, including via a frequency analysis, and create the model of the heave with reference to the determined prevailing modes, wherein the prediction instructions continuously parameterize the model with reference to the data of the measuring device, wherein an amplitude and phase of the modes are parameterized.

19. A method, comprising:

controlling a crane which includes a hoisting gear lifting a load hanging on a cable; and compensating heave including automatically actuating the hoisting gear based on a movement of one or more of a cable suspension point and a load deposition point to compensate the heave wherein the heave compensation takes account of at least one constraint of the hoisting gear including at least one of maximum available velocity and maximum available power when calculating the actuation of the hoisting gear and that the heave compensation calculates a trajectory of the hoisting gear with reference to a predicted movement of the one or more of the cable suspension point and the load deposition point, which is included in a setpoint value for a subsequent control of the hoisting gear.

20. The method according to claim 19, wherein the trajectory is one or more of a position trajectory, a velocity trajectory, and an acceleration trajectory.

* * * * *